(No Model.)

G. R. MENEELY.
JOURNAL BOX.

No. 345,798. Patented July 20, 1886.

WITNESSES
Geo. A. Darby.
Charles D. Bruntnall

INVENTOR
George R. Meneely
by W. E. Hagan
his atty

UNITED STATES PATENT OFFICE.

GEORGE R. MENEELY, OF ALBANY, NEW YORK.

JOURNAL-BOX.

SPECIFICATION forming part of Letters Patent No. 345,793, dated July 20, 1886.

Application filed January 7, 1886. Serial No. 187,868. (No model.)

*To all whom it may concern:*

Be it known that I, GEORGE R. MENEELY, of the city of Albany, county of Albany, State of New York, have invented new and useful Improvements in Journal-Boxes, of which the following is a specification.

My invention relates to journal-boxes, and more particularly to certain improvements upon the invention described in Letters Patent granted to me November 26, 1872, No. 133,472. In said older patent before named there is described a lining made of hard metal, having a securing back part of soft tough metal, the two kinds of metal being united where they come in contact by pouring one of them while molten over and onto the other while the latter is in the mold, and by which means a welded union of the two kinds of metal is made where they come in contact. In my present application the same general process of welding the hard-metal part forming the surface of the bearing to the soft-metal part is continued, the improvement relating to the form of the hard-metal plate to increase the welding-surface where the two kinds of metal are united or in contact.

Accompanying this specification, to form a part of it, there is a sheet of drawings containing three figures illustrating my invention, with the same designation of parts by letter-reference used in all of them.

Figure 1:
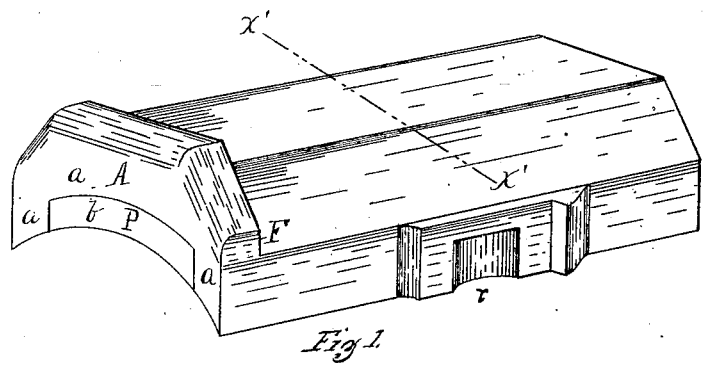
Figure 2:
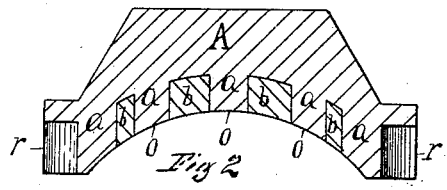
Figure 3:
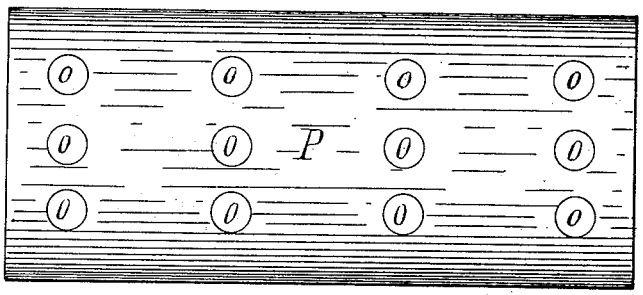

Of these illustrations, Figure 1 shows a perspective of my improved journal-box. Fig. 2 shows a cross-section of the same, taken on the line $x'\,x'$ of Fig. 1. Fig. 3 shows a plan view of the plate of hard metal that is welded into the soft metal to form a part of the bearing-surface proper of the journal-box.

The several parts of the journal-box thus illustrated are designated by letter-reference, and their function is explained as follows:

The letter A designates the bearing part of a journal-box, made with the usual ears, $e$, and recesses $r$, formed at each side thereof, and the letter F designates the end rim. The part of the journal indicated at $a$ is made of cheap soft metal—such as tough brass or bronze—and the part $b$ is made of bell-metal or other like hard metal suitable to resist the wearing action of the axle. The form of this hard metal as a part of my invention is functional and essential in carrying out the purposes of it. This hard-metal plate P has on its lower surface a concavity that is lineally coincident with that of the soft metal where the latter subtends the sides of the plate. This plate P has straight sides, and has in it a series of holes, O, the function of these holes being to more securely weld in and together the plate and the soft metal.

Where a plate of hard metal is used in a journal-box as a bearing-surface, and held in place by dovetails at the side or top, the constant friction of the axle exerted in one direction for a long time and then for a long time in another direction tends to force the hard metal against the dovetail of the soft metal in the line of the pressure, and crowds it out where it is worn off by the axle, thus loosening the plate, in which condition it is liable to break. To avoid these contingencies, I attach the plate P to the soft metal at various points throughout its length and breadth by means of the holes O, that are formed therein, the attachment being made in the following manner: The exterior form of the journal-box having been molded in the sand, the plate P is laid on the surface of the convex floor of the mold and the soft metal poured in around it, the plate P having been previously heated to make more positive the weld. As the soft metal enters the mold, it fills the latter, and surrounds the plate P, entering the holes therein to fill them on a line coincident with the convex floor of the mold, and thoroughly welds the plate and soft metal together at a series of vertical points from end to end and side to side, and also upon all of its other surfaces where in contact with the soft metal, so that it is firmly held therein.

By means of the hard-metal plate P, thus made and secured within the soft-metal part, I am enabled to cheapen the cost of the bearing.

I disclaim a bearing made with an iron shell or case and a longitudinally-placed brass rib formed with an upwardly-projected central portion and having lateral arms, soft metal being applied to fill up the cavities of said rib, as described in Letters Patent No. 38,808, dated June 9, 1863. I also disclaim a plate of hard metal inserted in a soft-metal backing, and held in place therein by dovetails at the top.

The holes O have a functional form as made in the hard-metal plate, and the latter is combined with the soft-metal part, and so applied that the latter shall tongue into the hard-metal part by means of the holes, and this effect would be had through the function of the parts as thus made and connected, whether the soft metal was poured into the mold at a welding heat or merely hot enough to flow into the mold, so as to enter the holes and inclose the top and sides of the hard-metal part.

Having thus described my invention, what I claim, and desire to secure by Letters Patent, is—

A journal-box composed of a body part of soft bronze or brass or other tough metal, a plate of hard metal that is made with vertical holes, said plate being longitudinally arranged within said soft-bronze body part, and the metal of the bronze body part within the holes of the hard-metal plate, the bottom surface of said hard-metal plate and said bronze-metal body part having the same lineal concavity, with the engaging surfaces of said bronze body part and such hard-metal plate being firmly united to each other by pouring the molten metal producing the body part over, into, and around the hard-metal plate placed upon the floor of the mold, substantially as and for the purposes set forth.

Signed at Troy, New York, this 16th day of November, 1885, in the presence of the two witnesses whose names are hereto written.

GEO. R. MENEELY.

Witnesses:
CHARLES S. BRINTNALL,
GEO. A. DARBY.